(12) United States Patent
Yang

(10) Patent No.: US 8,409,042 B2
(45) Date of Patent: Apr. 2, 2013

(54) EXTERNALLY ROTATING MECHANISM THROUGH OFFSET OUTER ROTATING ELECTRICAL MACHINE DRIVE

(76) Inventor: Tai-Her Yang, Dzan-Hwa (TW)

( * ) Notice: Subject to any disclaimer, the term of this patent is extended or adjusted under 35 U.S.C. 154(b) by 636 days.

(21) Appl. No.: 12/585,804

(22) Filed: Sep. 25, 2009

(65) Prior Publication Data

US 2011/0072926 A1 Mar. 31, 2011

(51) Int. Cl.
*F16H 48/06* (2006.01)
(52) U.S. Cl. ............................................. 475/149; 475/4
(58) Field of Classification Search .................. 475/4, 5, 475/149, 207
See application file for complete search history.

(56) References Cited

U.S. PATENT DOCUMENTS

| | | | | |
|---|---|---|---|---|
| 3,812,928 A | * | 5/1974 | Rockwell et al. | 180/65.51 |
| 6,321,863 B1 | * | 11/2001 | Vanjani | 180/65.51 |
| 2003/0183034 A1 | * | 10/2003 | Yang | 74/421 A |
| 2007/0209852 A1 | * | 9/2007 | Kamiya | 180/65.5 |
| 2008/0070736 A1 | * | 3/2008 | Yoshino et al. | 475/149 |

* cited by examiner

*Primary Examiner* — Justin Holmes
(74) *Attorney, Agent, or Firm* — Bacon & Thomas, PLLC

(57) ABSTRACT

The present invention relies on the offsetting of one or more outer rotating electrical machines in the interior of the externally rotating mechanism; and the coaxial installation of running wheels with the rotating housing of the outer rotating electrical machine which include gears and friction wheels to couple with the ring type inner running wheel installed inside the externally rotating mechanism wheel hub in order to constitute a variable speed drive function.

19 Claims, 15 Drawing Sheets

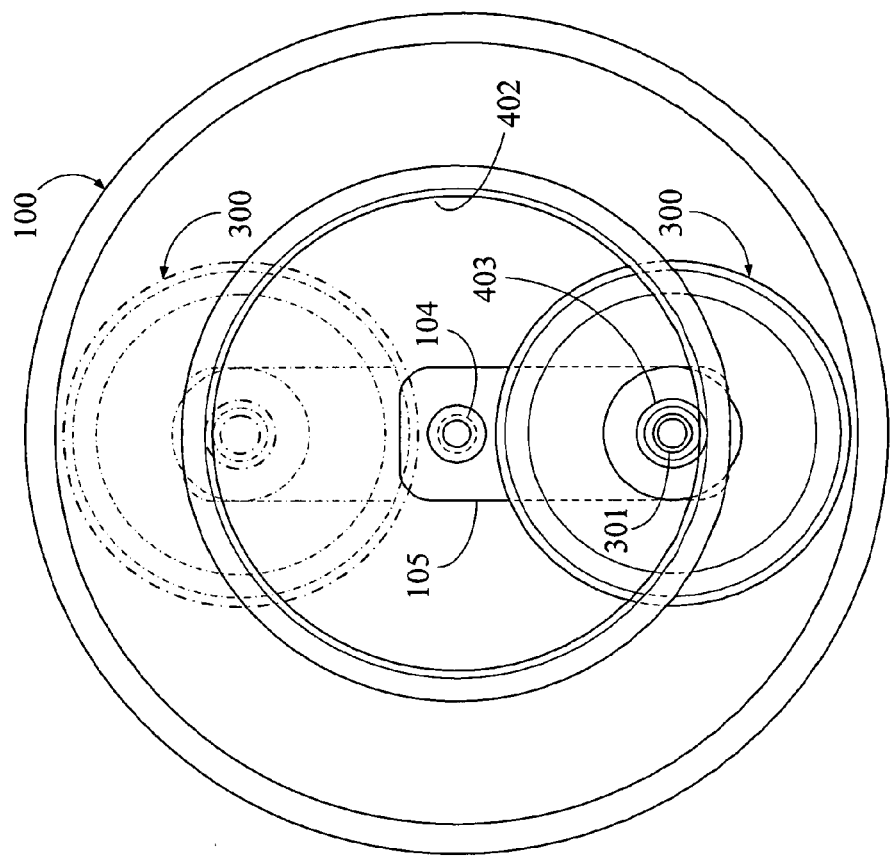
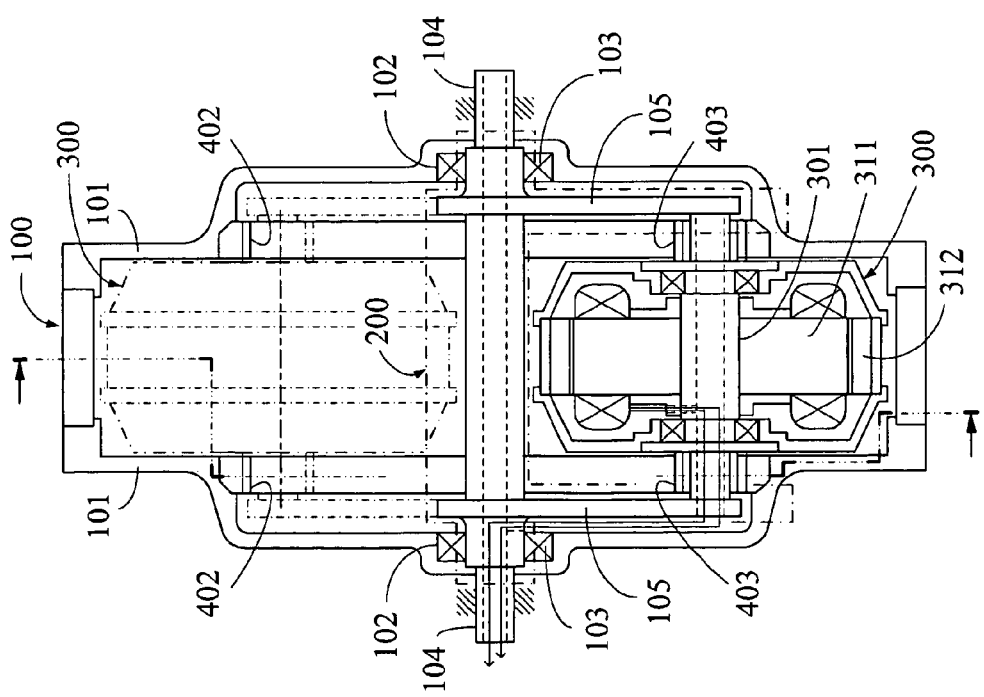
FIG. 12
FIG. 11

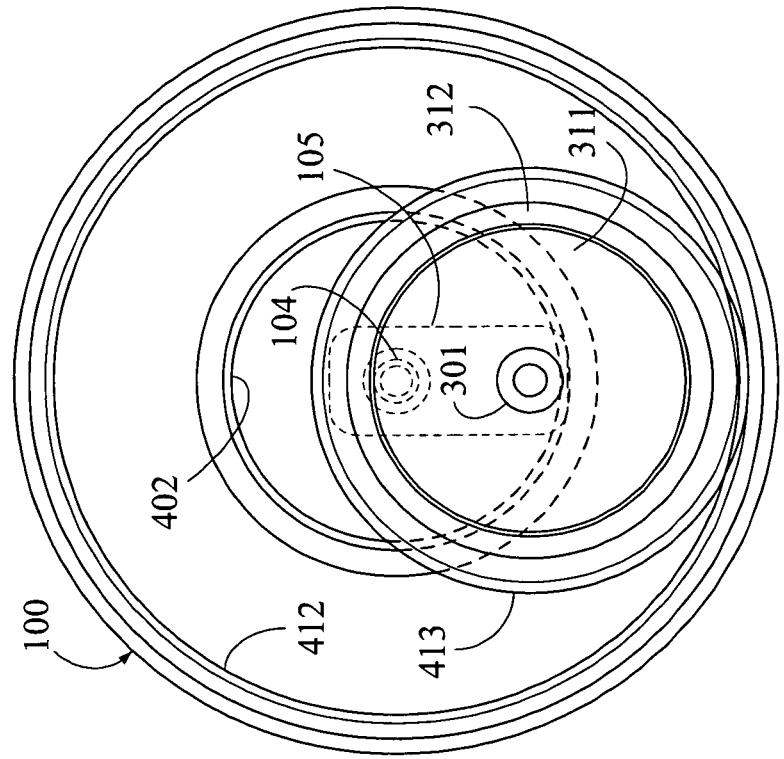
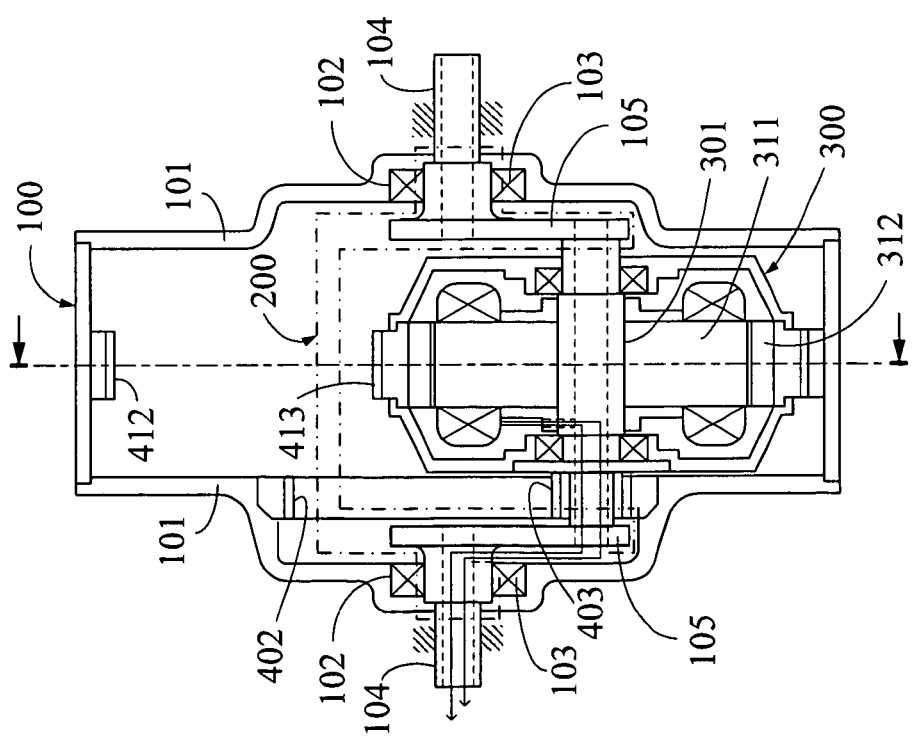
FIG. 20
FIG. 19

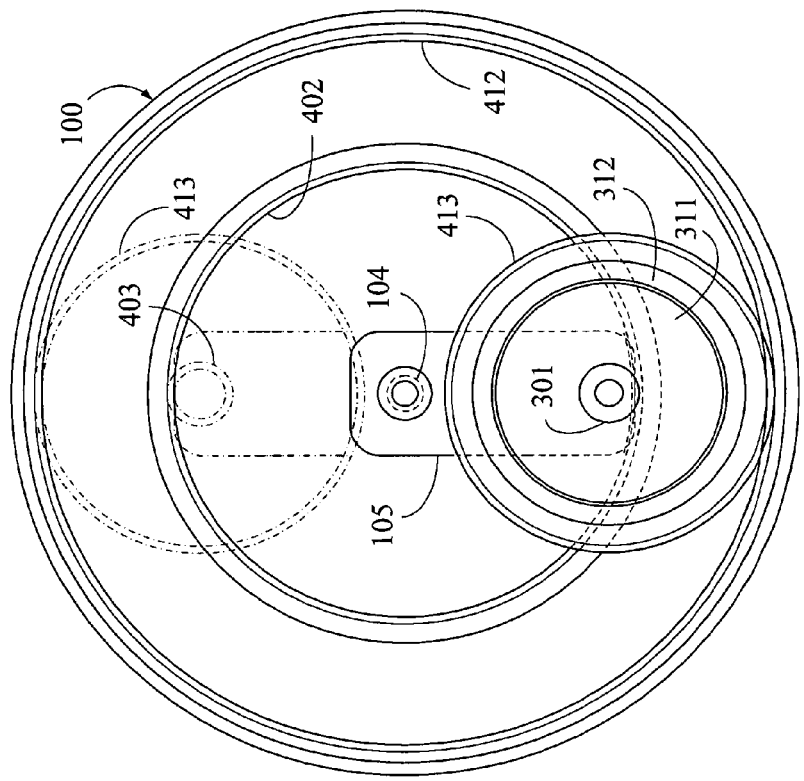
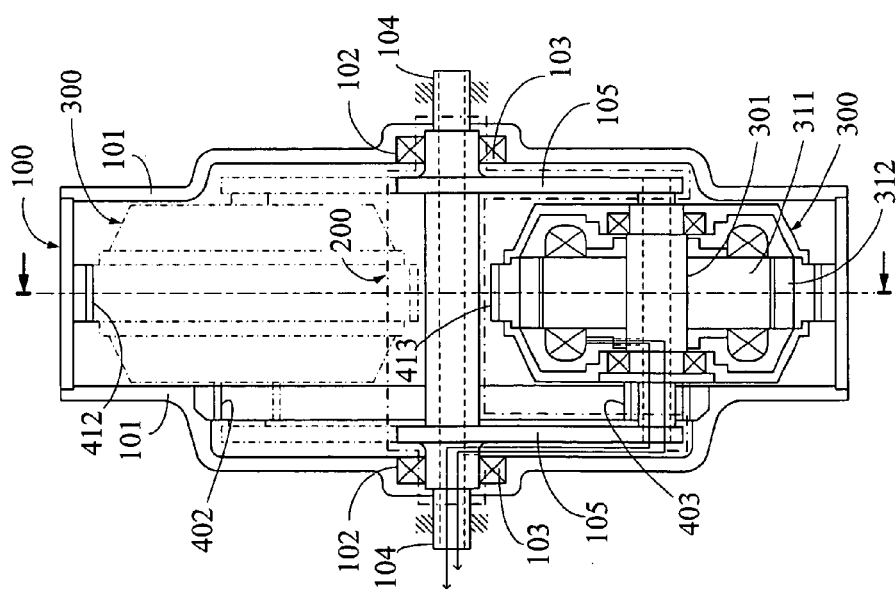
FIG. 24
FIG. 23 ately rotating mechanism through offset outer rotating electrical machine drive. One or more outer rotating electrical machines is/are installed offset in the interior of the externally rotating mechanism; furthermore a running wheel is coaxially installed with the outer rotating electrical machine housing which includes gear or friction wheel in order to couple with the ring type inner running wheel installed inside the externally rotating mechanism wheel hub which includes gear or friction wheel to constitute a variable speed driving function. The externally rotating mechanism of the present invention supply mechanical power to drive the outer rotating electrical machine in order to generate electrical energy; or power is passed through the outer rotating electrical machine to produce mechanical power in order to drive the externally rotating mechanism.

(b) Description of the Prior Art

The traditional way of letting the rotating electrical machine to directly drive the externally rotating drive mechanism is limited to the shortcomings of the torsion of the motor itself which can not produce greater torsional force.

EXTERNALLY ROTATING MECHANISM THROUGH OFFSET OUTER ROTATING ELECTRICAL MACHINE DRIVE

BACKGROUND OF THE INVENTION (a) Field of the Invention

The present invention relates to an innovative design of externally rotating mechanism through offset outer rotating electrical machine drive. One or more outer rotating electrical machines is/are installed offset in the interior of the externally rotating mechanism; furthermore a running wheel is coaxially installed with the outer rotating electrical machine housing which includes gear or friction wheel in order to couple with the ring type inner running wheel installed inside the externally rotating mechanism wheel hub which includes gear or friction wheel to constitute a variable speed driving function. The externally rotating mechanism of the present invention supply mechanical power to drive the outer rotating electrical machine in order to generate electrical energy; or power is passed through the outer rotating electrical machine to produce mechanical power in order to drive the externally rotating mechanism.

SUMMARY OF THE INVENTION

An externally rotating mechanism through offset outer rotating electrical machine drive is constituted of an externally rotating mechanism, offset mechanism, outer rotating electrical machine and transmission. The externally rotating mechanism is equipped with a wheel hub structure; and installed with a fixed axle to facilitate rotation of the wheel hub. An offset mechanism is further installed inside the wheel hub. The radial offset mechanism is installed with one or more extension arm/s for deployment of one or more rotary arbors and to become an offset outer rotating electrical machine with the fixed axle rotating the wheel hub. A running wheel is coaxially installed with the outer rotating electrical machine rotary cover which includes gear or friction wheel to couple with the ring type inner running wheel installed inside the wheel hub in order to enable a running function between the outer rotating electrical machine rotary parts of the outer rotating electrical machine and the externally rotating mechanism. The running wheels of the individual outer rotating electrical machine rotary part together couple with the ring type inner running wheel installed inside the wheel hub in order to jointly drive the externally rotating mechanism to improve power.

BRIEF DESCRIPTION OF THE DRAWINGS

FIG. 11 is the third operational side sectional view of the present invention showing both sides of the outer rotating electrical machine housing installed with running wheels (403) and both sides of the wheel hub (101) interior installed with ring type inner running wheels (402).

FIG. 12 is the operational front sectional view of the present invention in FIG. 11.

FIG. 19 is the first operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

FIG. 20 is the operational front sectional view of the present invention in FIG. 19.

FIG. 23 is the third operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

FIG. 24 is the operational front sectional view of the present invention in FIG. 23.

Figure 2:
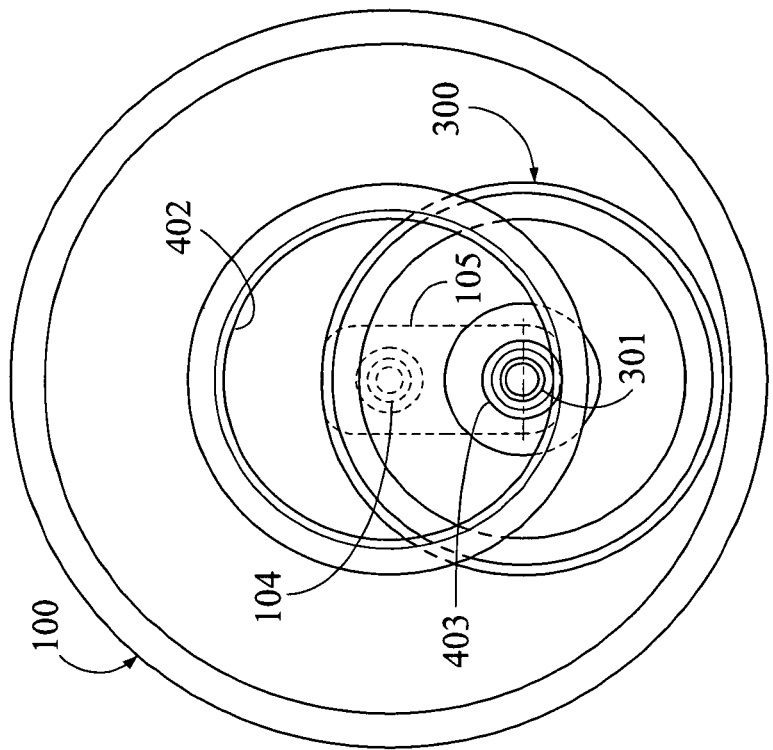
FIG. 2 is an operational front sectional view of the present invention in FIG. 1.

DESCRIPTION OF MAIN COMPONENT SYMBOLS (100): Externally rotating mechanism
(101): Wheel hub
(102): Axle hole
(103): Bearing
(104): Fixed axle
(105): Extension arm
(200): Offset structure
(300): Outer rotating electrical machine
(301): Electrical machine arbor
(311): Electrical machine static part
(312): Electrical machine rotary part
(320): Power lead wire
(402): Ring type inner running wheel
(403): Running wheel
(412): Ring type inner running wheel
(413): Ring type outer running wheel

DETAILED DESCRIPTION OF THE PREFERRED EMBODIMENTS

An externally rotating mechanism through offset outer rotating electrical machine drive is constituted of an externally rotating mechanism, offset mechanism, outer rotating electrical machine and transmission. The externally rotating mechanism is equipped with a wheel hub structure; and installed with a fixed axle to facilitate rotation of the wheel hub. An offset mechanism is further installed inside the wheel hub. The radial offset mechanism is installed with one or more extension arm/s for deployment of one or more rotary arbors and to become an offset outer rotating electrical machine with the fixed axle rotating the wheel hub. A running wheel is coaxially installed with the outer rotating electrical machine rotary housing which includes gear or friction wheel to couple with the ring type inner running wheel installed inside the wheel hub in order to enable a running function between the outer rotating electrical machine rotary parts of the outer rotating electrical machine and the externally rotating mechanism. The running wheels of the individual outer rotating electrical machine rotary part together couple with the ring type inner running wheel installed inside the wheel hub in order to jointly drive the externally rotating mechanism to improve power.

Figure 1:
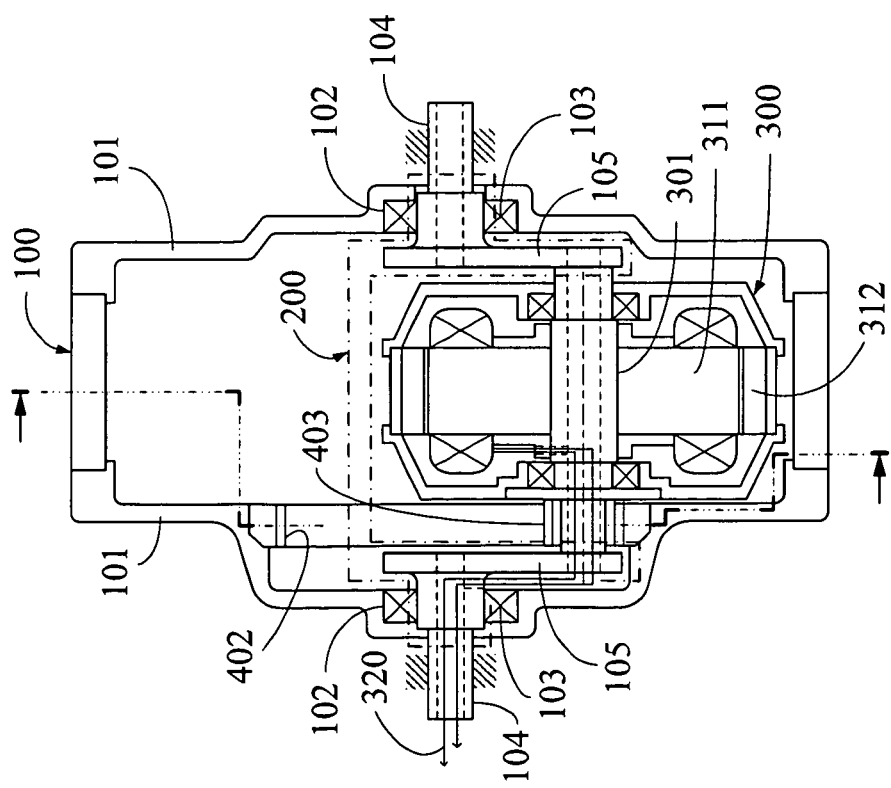
FIG. 1 is the first operational side sectional view of the present invention showing one side of the externally rotating electrical machine housing installed with a running wheel (403), and one side of the wheel hub (101) installed with a ring type inner running wheel (402).

Described hereunder are the structural features and other functions and objectives of the present invention according to the operational diagrams attached herein:

As shown in the various operational diagrams from FIG. 1 to FIG. 30, the present invention is mainly composed of externally rotating mechanism, offset mechanism, outer rotating electrical machine and transmission; wherein:

Externally rotating mechanism (100): A wheel hub (101) with hollow housing structure composed correspondingly by two symmetric or asymmetric concave discs or formed by two disc shaped housing with a cylindrical hollow housing. Axle holes (102) are installed at the center on both sides of the housing. Bearings (103) are installed separately on the axle holes (102) for passing through a fixed axle (104) individually so that the axle holes (102) on both sides of the casing are in coaxial state. The fixed axle (104) located inside the wheel hub (101) combines with the offset structure (200) such that the wheel hub (101) correspondingly composed by the housing can rotate around the fixed axle (104);

Offset structure (200): Combines with the fixed axle (104) to fix the axle holes (102) on both sides, and at the center of the casing so that they assume a coaxial state. The offset structure (200) is also equipped with extension arms (105) to combine with both ends of the electrical machine arbor (301) of the fixed electrical machine static part (311) of the outer rotating electrical machine (300). The offset structure is consisted of: 1) offset structure (200) which is a U-shape structure for combining with the fixed axle (104); or 2) offset structure (200) which is a square-shape structure for combining with the fixed axle (104); or 3) offset structure (200) which is an axle section that combines with the fixed axle (104) as the one-piece fixed axle (104) passes through the axle holes (102) at the center and on both sides of the wheel disc to the interior of the wheel hub (101);

Outer rotating electrical machine (300): Composed of relatively rotating electrical machine rotary part (312) and electrical machine static part (311) and other electrical machine structures wherein the electrical machine arbor (301) and the penetrated electrical machine static part (311) are fixed. The electrical machine rotary part (312) which performs outer rotary operation is for coupling with the electrical machine arbor (301) to perform rotary motion, and to drive each other by means of the transmission and the externally rotating mechanism (100). The outer rotating electrical machine (300) is either a brushless or brushed direct current or alternating current motor or generator. Moreover, it is either a synchronous or asynchronous or step drive motor or generator according to requirements. The power lead wire (320) of the outer rotating electrical machine (300) can extend outward along the extension arm (105) and passes through the wire hole of the fixed axle (104);

Transmission: Includes the running wheel (403) installed at the side of the electrical machine rotary part (312) of the outer rotating electrical machine (300), and the ring type inner running wheel (402) installed inside the wheel hub (101) which uses the fixed axle (104) as its axis; and/or composed of the ring type outer running wheel (413) installed around the outer rotating electrical machine casing, and the ring type inner running wheel (412) installed on the externally rotating mechanism (100). The aforementioned running wheel (403) and ring type inner running wheel (402), and/or the ring type outer running wheel (413) and ring type inner running wheel (412) are composed of gears or friction wheels;

The numbers of running steps of the aforementioned transmission are one or more steps;

The method of installation of the transmission consists of:

1) A running wheel (403) is installed coaxially at the side of the electrical machine rotary part (312) of the outer rotating electrical machine (300) to couple mutually with the ring type inner running wheel (402) which uses the fixed axle (104) as its axis and installed at the same side inside the wheel hub (101) in order to form a transmission; or
2) Running wheels (403) is coaxially installed on both sides of the electrical machine rotary part (312) of the outer rotating electrical machine (300) for coupling with ring type inner running wheels (402) which use the fixed axle (104) as their axes and are installed on both sides of the wheel hub (101). The two sets of running wheels couple with each other to form the transmission; or
3) Ring type running wheel (413) is installed around the housing of the electrical machine rotary part (312) of the outer rotating electrical machine (300), and ring type inner running wheel (412) is installed in the inner ring space of the externally rotating mechanism (100). The two sets of running wheels couple with each other to form the transmission; or
4) Item 1) and 3) installed simultaneously; or
5) Item 2) and 3) installed simultaneously;

FIG. 1 to FIG. 6 show the installation of running wheel (403) installed on one side of the electrical machine rotary part (312) of the outer rotating electrical machine (300) for mutual coupling and driving with the ring type inner running wheel (402) which uses the fixed axle (104) as its axis at the same side inside the wheel hub (101). This method of transmission is applied on various forms of offset mechanisms (200) as described hereunder:

As shown from FIG. 1 to FIG. 6, the structural form of the offset mechanism (200) is composed of one of the methods listed below:

1) FIG. 1 is the first operational side sectional view of the present invention showing one side of the externally rotating electrical machine housing installed with a running wheel (403), and one side of the wheel hub (101) installed with a ring type inner running wheel (402).

FIG. 2 is the operational front sectional view of the present invention in FIG. 1.

As shown in FIG. 1 and FIG. 2, the offset mechanism (200) is a U-shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). A running wheel (403) is installed on one side of the electrical machine rotary part (312) of the outer rotating electrical machine (300) that is performing outside rotation, and a ring type inner running wheel (402) which is using the fixed axle (104) as its axis is installed on the same side inside the wheel hub (101). The two running wheels couple and drive to form the transmission. The aforementioned running wheel (403) and ring type inner running wheel (402) are composed of gears and friction wheels. The numbers of driving steps of the aforementioned transmission are one or more.

Figure 3:
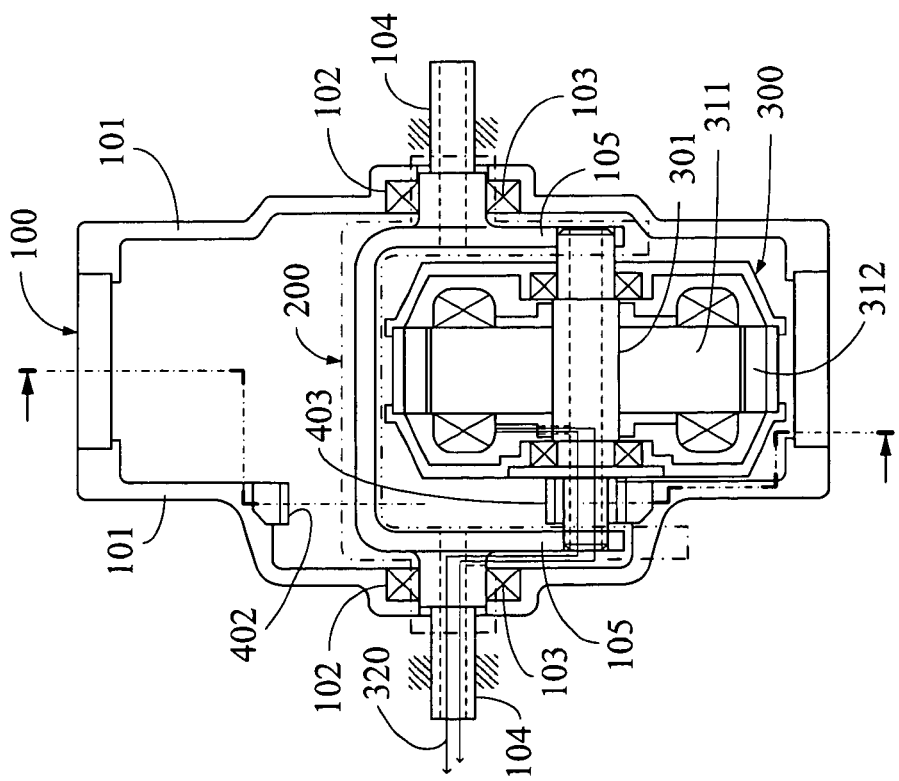
FIG. 3 is the second operational side sectional view of the present invention showing one side of the outer rotating electrical machine housing installed with a running wheel (403) and one side of the wheel hub (101) installed with a ring type inner running wheel (402).

2) FIG. 3 is the second operational side sectional view of the present invention showing one side of the outer rotating electrical machine housing installed with a running wheel (403) and one side of the wheel hub (101) installed with a ring type inner running wheel (402).

Figure 4:
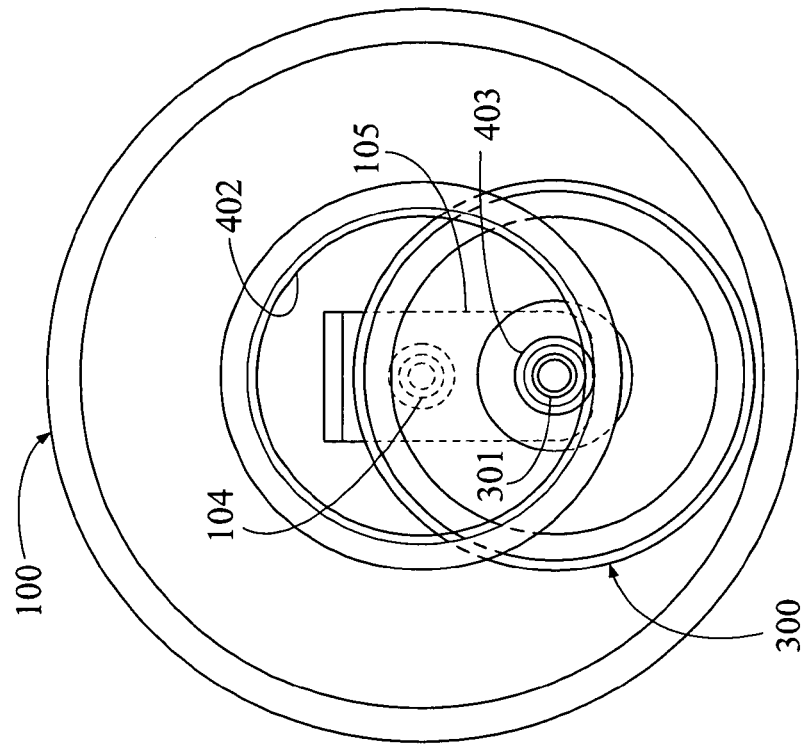
FIG. 4 is the operational front sectional view of the present invention in FIG. 3.

FIG. 4 is the operational front sectional view of the present invention in FIG. 3.

As shown in FIG. 3 and FIG. 4, the offset mechanism (200) is a square shape structure. The offset mechanism (200) is for combining with the fixed axle (104). Both ends of its extension arm (105) permanently combines with both ends of the electrical machine arbor (301) of the fixed electrical machine static part (311) of the outer rotating electrical machine (300). A running wheel (403) is installed on one side of the electrical machine rotary part (312) of the outer rotating electrical machine (300) that is performing outside rotation, and a ring type inner running wheel (402) which is using the fixed axle (104) as its axis is installed on the same side inside the wheel hub (101). The two running wheels couple and drive to form the transmission. The aforementioned running wheel (403) and ring type inner running wheel (402) are composed of gears and friction wheels. The numbers of driving steps of the aforementioned transmission is/are one or more steps.

Figure 5:
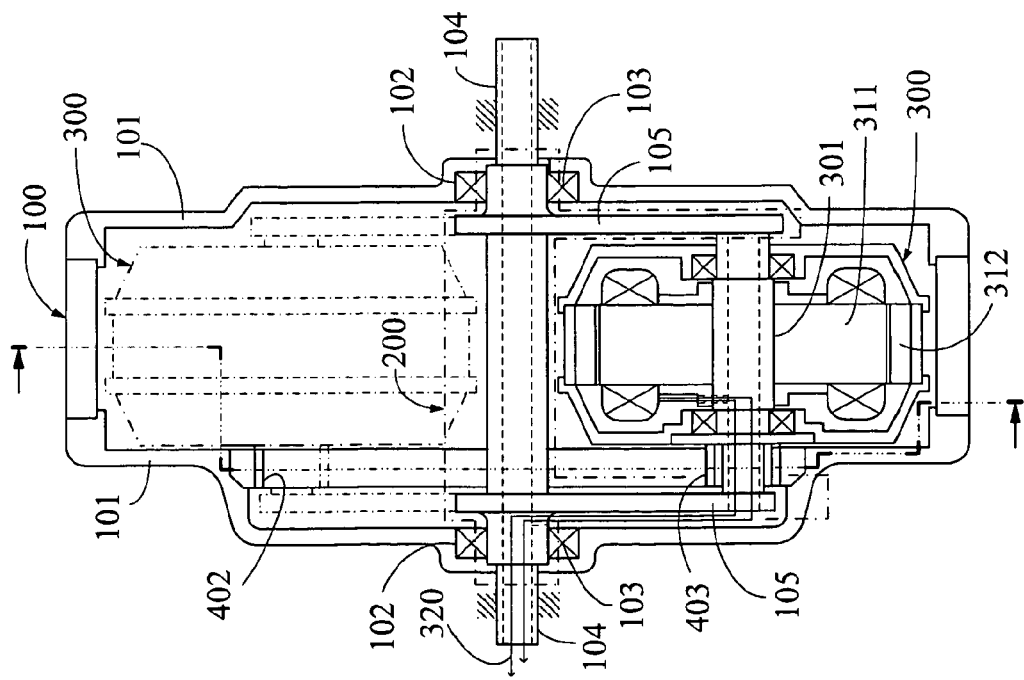
FIG. 5 is the third operational side sectional view of the present invention showing one side of the outer rotating electrical machine housing installed with a running wheel (403) and one side of the wheel hub (101) installed with a ring type inner running wheel (402).

3) FIG. 5 is the third operational side sectional view of the present invention showing one side of the outer rotating electrical machine housing installed with a running wheel (403) and one side of the wheel hub (101) installed with a ring type inner running wheel (402).

Figure 6:
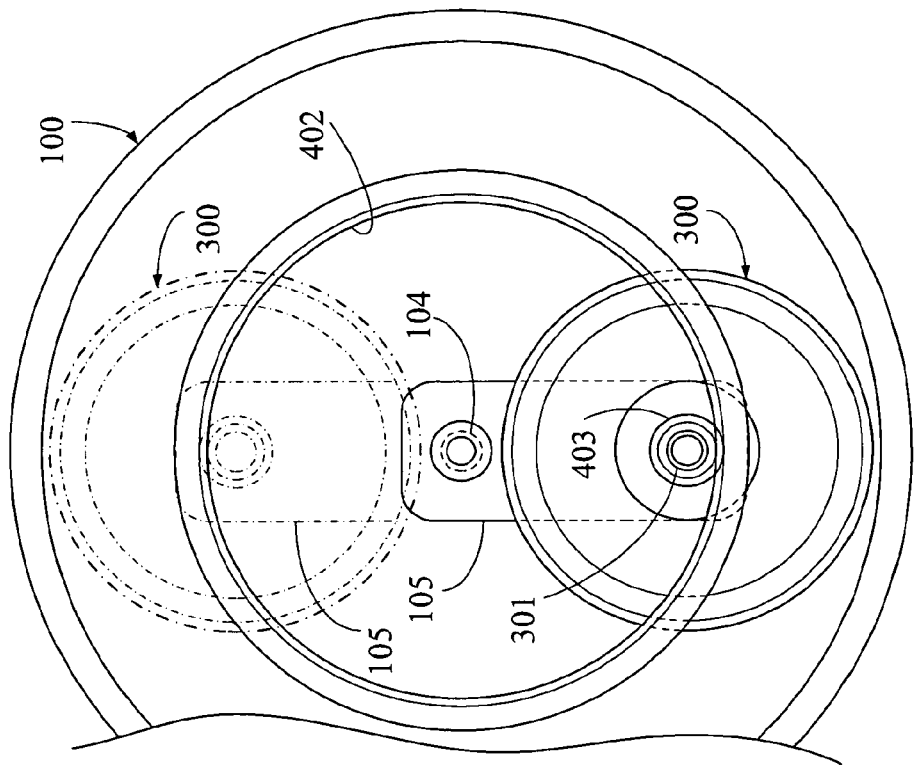
FIG. 6 is the operational front sectional view of the present invention in FIG. 5.

FIG. 6' is the operational front sectional view of the present invention in FIG. 5.

As shown in FIG. 5 and FIG. 6, the offset structure (200) has a one-piece fixed axle (104) penetrating through the axle holes (102) installed on both sides and at the center of the wheel disc, and a section of the axle that combines with the offset structure (200) when the fixed axle (104) passes through the wheel hub (101) interior. The extension arm (105) of the offset structure (200) is to permanently combine with both ends of the electrical machine arbor (301) of the electrical machine static part (311) of the outer rotating electrical machine (300) so that the driving axis of the outer rotating electrical machine rotary part (312) and the fixed axle (104) driving the wheel hub (101) become offset and uncoaxial. A running wheel (403) is installed on one side of the electrical machine rotary part (312). A ring type inner running wheel (402) is installed around the fixed axle (104) axis on the same side inside the wheel hub (101). The two running wheels couple and drive to form the transmission; the numbers of the driving steps of the aforementioned transmission is/are one or more steps.

The offset structure (200) that combined with the section of the fixed axle (104) which passes through the interior of the wheel hub (101) is formed by one or more axial or radial offset structures (200) extending outward for separate installation of one or more outer rotating electrical machine (300). Running wheels (403) are individually installed on the same side of the electrical machine rotary part (312) of the individual outer rotating electrical machine to couple altogether with the ring type inner running wheel (402) on the same side inside the wheel hub (101) in order to form a common externally rotating mechanism driven by multiple electrical machines.

Figure 7:
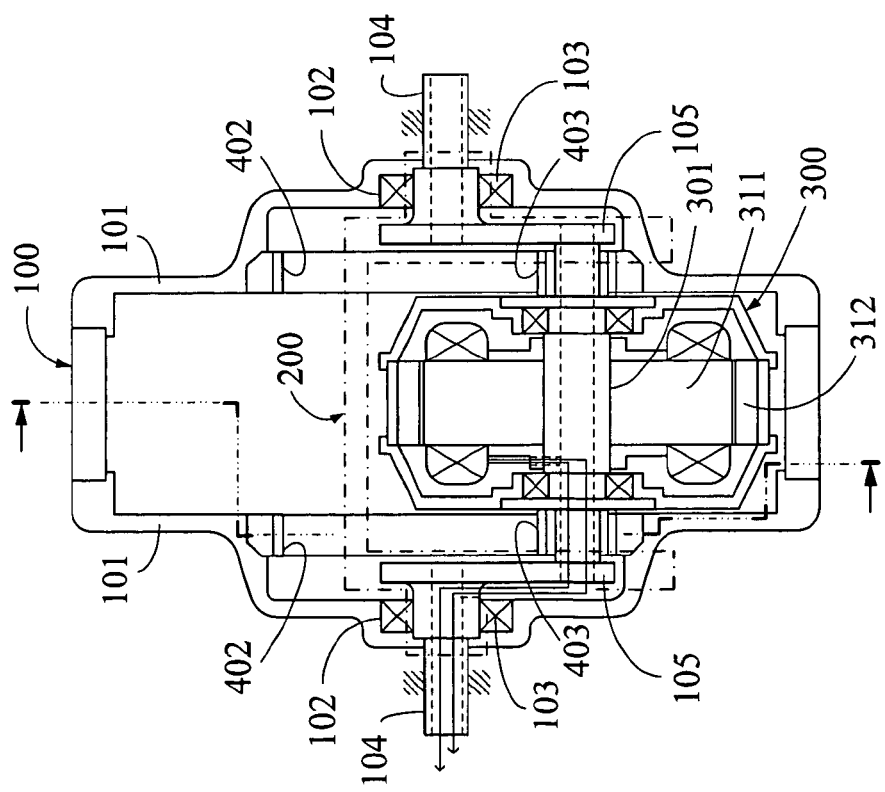
FIG. 7 is the first operational side sectional view of the present invention showing both sides of the outer rotating electrical machine housing installed with running wheels (403) and both sides of the wheel hub (101) interior installed with ring type inner running wheels (402).

FIG. 7 to FIG. 12 show the coaxial installation of running wheels (403) on both sides of the electrical machine rotary part (312) of the outer rotating electrical machine (300) for mutual coupling and drive with the ring type inner running wheels (402) which use the fixed axle (104) as their axes and installed on both sides inside the wheel hub (101). This method of drive is applied on various forms of offset structures (200), and described in the following:

As shown in FIG. 7 to FIG. 12, the structural form of the offset structure (200) is consist of one of the following methods:

1) FIG. 7 is the first operational side sectional view of the present invention showing both sides of the outer rotating electrical machine housing installed with running wheels (403) and both sides of the wheel hub (101) interior installed with ring type inner running wheels (402).

Figure 8:
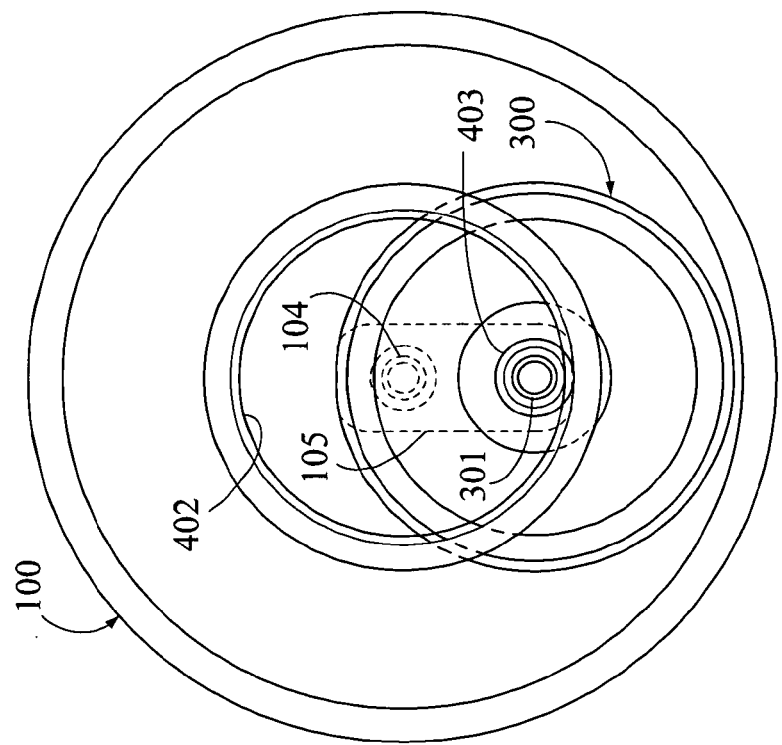
FIG. 8 is the operational front sectional view of the present invention in FIG. 7.

FIG. 8 is the operational front sectional view of the present invention in FIG. 7.

As shown in FIG. 7 and FIG. 8, the offset mechanism (200) is a U-shape structure. The offset mechanism (200) is for combining with the fixed axle (104). Both ends of its extension arm (105) permanently combines with both ends of the electrical machine arbor (301) of the fixed electrical machine static part (311) of the outer rotating electrical machine (300). A running wheel (403) is installed on both sides of the electrical machine rotary part (312) of the outer rotating electrical machine (300) that is performing outside rotation, and a ring type inner running wheel (402) which is using the fixed axle (104) as its axis is installed on both sides inside the wheel hub (101). The two running wheels couple and drive to form the transmission. The aforementioned running wheel (403) installed on both sides of the electrical machine rotary part (312) and ring type inner running wheels (402) installed on both sides of the wheel hub (101) interior are composed of gears and friction wheels. The numbers of driving steps of the aforementioned transmission are one or more.

Figure 9:
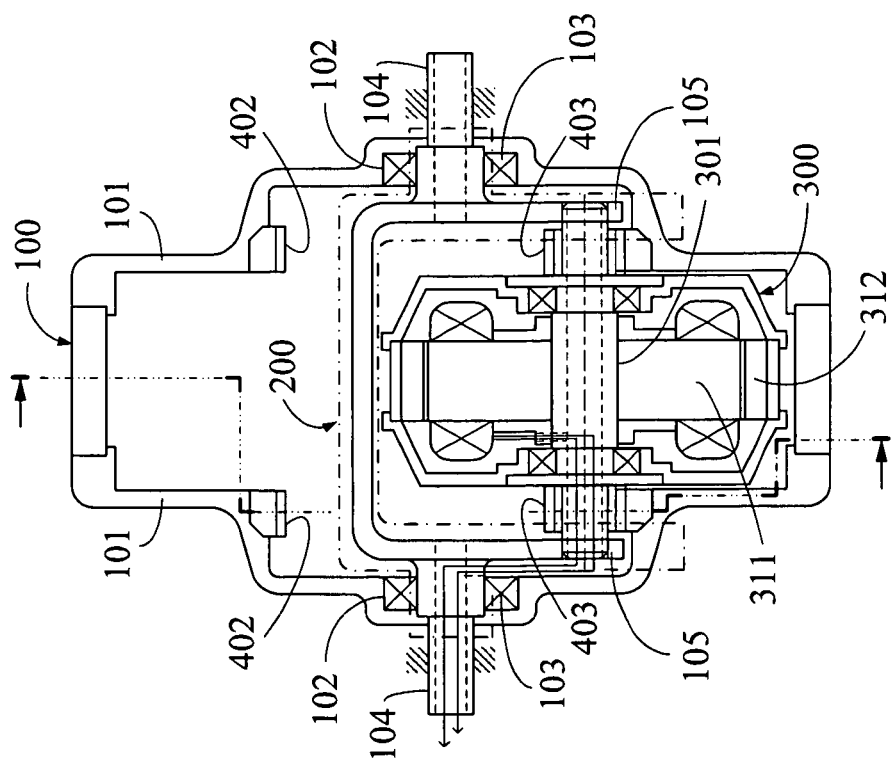
FIG. 9 is the second operational side sectional view of the present invention showing both sides of the outer rotating electrical machine housing installed with running wheels (403) and both sides of the wheel hub (101) interior installed with ring type inner running wheels (402).

2) FIG. 9 is the second operational side sectional view of the present invention showing both sides of the outer rotating electrical machine housing installed with running wheels (403) and both sides of the wheel hub (101) interior installed with ring type inner running wheels (402).

Figure 10:
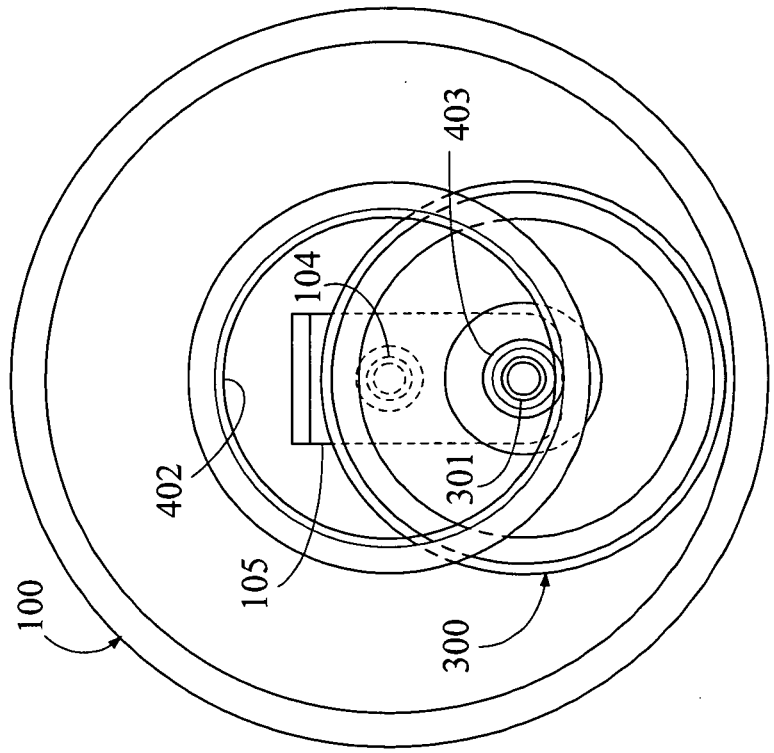
FIG. 10 is the operational front sectional view of the present invention in FIG. 9.

FIG. 10 is the operational front sectional view of the present invention in FIG. 9.

As shown in FIG. 9 and FIG. 10, the offset mechanism (200) is a square shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). Running wheels (403) are installed on both sides of the electrical machine rotary part (312) of the outer rotating electrical machine (300) that is performing outside rotation, and ring type inner running wheels (402) which are using the fixed axle (104) as their axis are installed on both sides inside the wheel hub (101). The two running wheels couple and drive to form the transmission. The aforementioned running wheels (403) installed on both sides of the electrical machine rotary part (312) and ring type inner running wheels (402) installed on both sides of the wheel hub (101) interior are composed of gears and friction wheels. The numbers of driving steps of the aforementioned transmission is/are one or more steps.

3) FIG. 11 is the third operational side sectional view of the present invention showing both sides of the outer rotating electrical machine housing installed with running wheels (403) and both sides of the wheel hub (101) interior installed with ring type inner running wheels (402).

FIG. 12 is the operational front sectional view of the present invention in FIG. 11.

As shown in FIG. 11 and FIG. 12, the offset structure (200) has a one-piece fixed axle (104) penetrating through the axle holes (102) installed on both sides and at the center of the wheel disc, and a section of the axle that combines with the offset structure (200) when the fixed axle (104) passes through the wheel hub (101) interior. The extension arm (105) of the offset structure (200) is to permanently combine with both ends of the electrical machine arbor (301) of the electrical machine static part (311) of the outer rotating electrical machine (300) so that the driving axis of the outer rotating electrical machine rotary part (312) and the fixed axle (104) driving the wheel hub (101) become offset and uncoaxial to each other. Running wheels (403) are installed on both sides of the electrical machine rotary part (312). Ring type inner running wheels (402) are installed around the fixed axle (104) axis on the both sides of the wheel hub (101) interior. The two sets of running wheels couple and drive to form the transmission; the aforementioned running wheels (403) installed on both sides of the electrical machine rotary part (312) and the ring type inner running wheels (402) installed on both sides of the wheel hub (101) are composed of gears or friction wheels. The numbers of the driving steps of the aforementioned transmission is/are one or more steps.

The offset structure (200) that combined with the section of the fixed axle (104) which passes through the interior of the wheel hub (101) is formed by one or more axial or radial offset structures (200) extending outward for separate installation of one or more outer rotating electrical machine (300). Running wheels (403) are individually installed on both sides of the electrical machine rotary part (312) of the individual outer rotating electrical machine to couple altogether with the ring type inner running wheels (402) on the both sides the wheel hub (101) interior in order to form a common externally rotating mechanism driven by multiple electrical machines.

Figure 13:
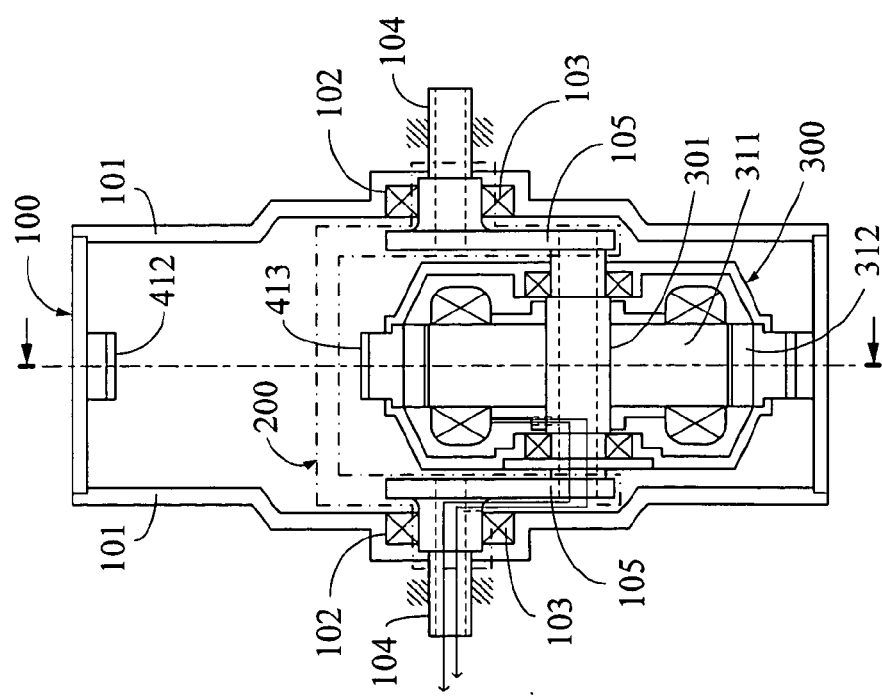
FIG. 13 is the first operational side sectional view of the present invention showing the surrounding of the housing of the outer rotating electrical machine rotary part of the outer rotating electrical machine (300) installed with ring type outer running wheel (413) and ring type inner running wheel (412) installed in the externally rotating mechanism (100).

FIG. 13 is the first operational side sectional view of the present invention showing the surrounding of the housing of the outer rotating electrical machine rotary part of the outer rotating electrical machine (300) installed with ring type outer running wheel (413) and ring type inner running wheel (412) installed in the externally rotating mechanism (100).

Figure 14:
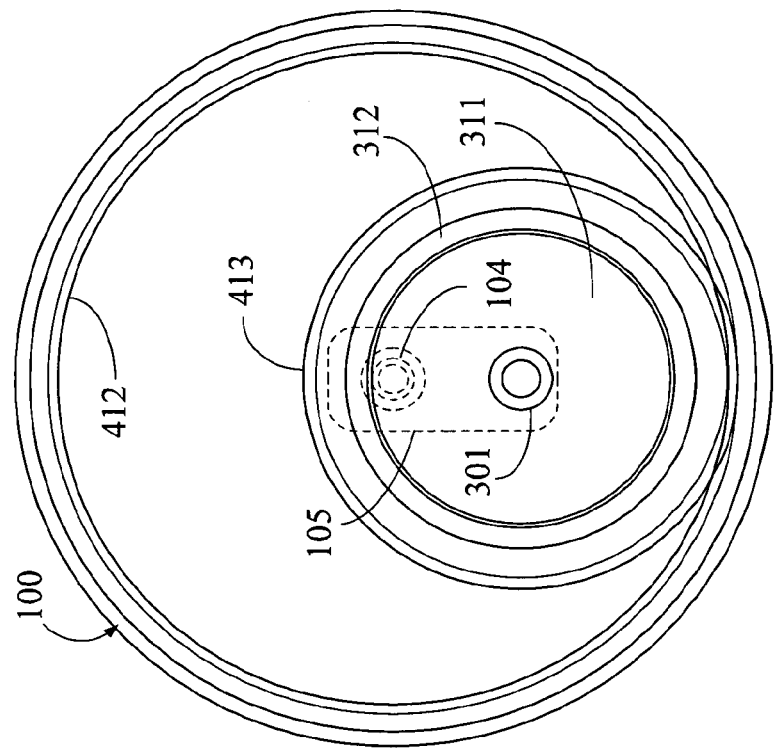
FIG. 14 is an operational front sectional view of the present invention in FIG. 13.

FIG. 14 is an operational front sectional view of the present invention in FIG. 13.

As shown in FIG. 13 and FIG. 14, the offset mechanism (200) is a U-shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). The driving axis of the outer rotating electrical machine rotary part (312) and the fixed axle (104) that provides the rotation for the wheel hub (101) are offset and uncoaxial to each other. The exterior of the electrical machine rotary part (312) is coaxially installed with a ring type outer running wheel (413) for coupling with the ring type inner running wheel (412) installed in the axial inner ring space of the externally rotating mechanism (100) in order to comprise the transmission between the electrical machine rotary part (312) of the outer rotating electrical machine and the externally rotating mechanism. The aforementioned ring type inner running wheel (412) and the coaxially installed ring type outer running wheel (413) are composed of gears and friction wheels. The numbers of driving steps of the aforementioned transmission is/are one or more.

Figure 15:
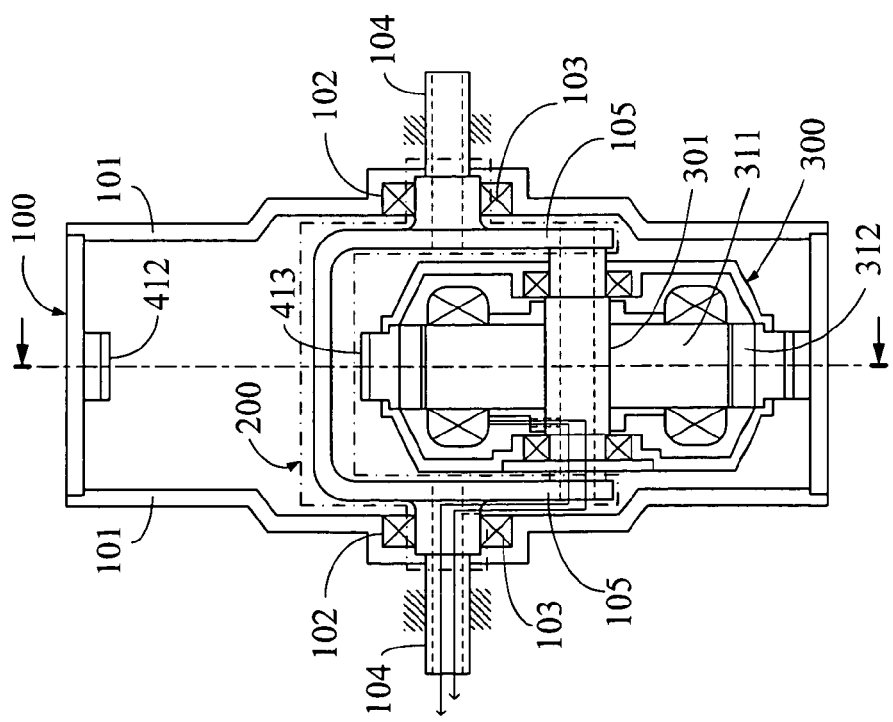
FIG. 15 is the second operational side sectional view of the present invention showing the surrounding of the housing of the outer rotating electrical machine rotary part of the outer rotating electrical machine (300) installed with ring type outer running wheel (413) and a ring type inner running wheel (412) installed in the externally rotating mechanism (100).

FIG. 15 is the second operational side sectional view of the present invention showing the surrounding of the housing of the outer rotating electrical machine rotary part of the outer rotating electrical machine (300) installed with ring type outer running wheel (413) and a ring type inner running wheel (412) installed in the externally rotating mechanism (100).

Figure 16:
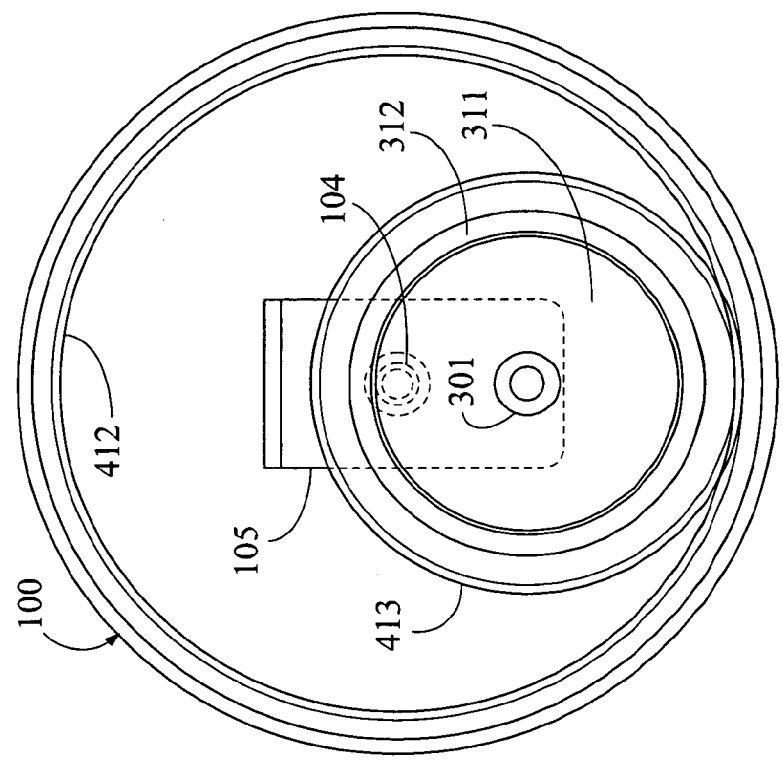
FIG. 16 is the operational front sectional view of the present invention in FIG. 15.

FIG. 16 is the operational front sectional view of the present invention in FIG. 15.

As shown in FIG. 15 and FIG. 16, the offset mechanism (200) is a square shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). The driving axis of the outer rotating electrical machine (312) is and the fixed axle (104) that provides rotation to the wheel hub (101) are offset and uncoaxial with each other. A ring type outer running wheel (413) is coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned ring type inner running wheels (412) and coaxially installed ring type outer running wheels (413) are composed of gears and friction wheels. The numbers of driving steps of the aforementioned transmission is/are one or more steps.

Figure 17:
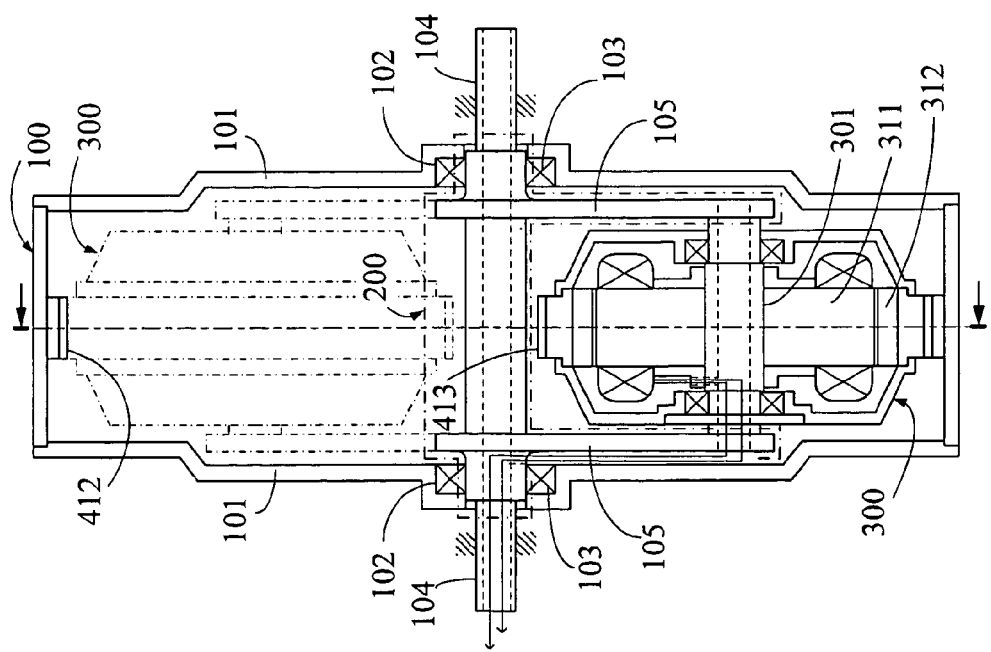
FIG. 17 is the third operational side sectional view of the present invention showing the surrounding of the housing of the outer rotating electrical machine rotary part of the outer rotating electrical machine (300) installed with ring type outer running wheel (413) and ring type inner running wheel (412) installed in the externally rotating mechanism (100).

FIG. 17 is the third operational side sectional view of the present invention showing the surrounding of the housing of the outer rotating electrical machine rotary part of the outer rotating electrical machine (300) installed with ring type outer running wheel (413) and ring type inner running wheel (412) installed in the externally rotating mechanism (100).

Figure 18:
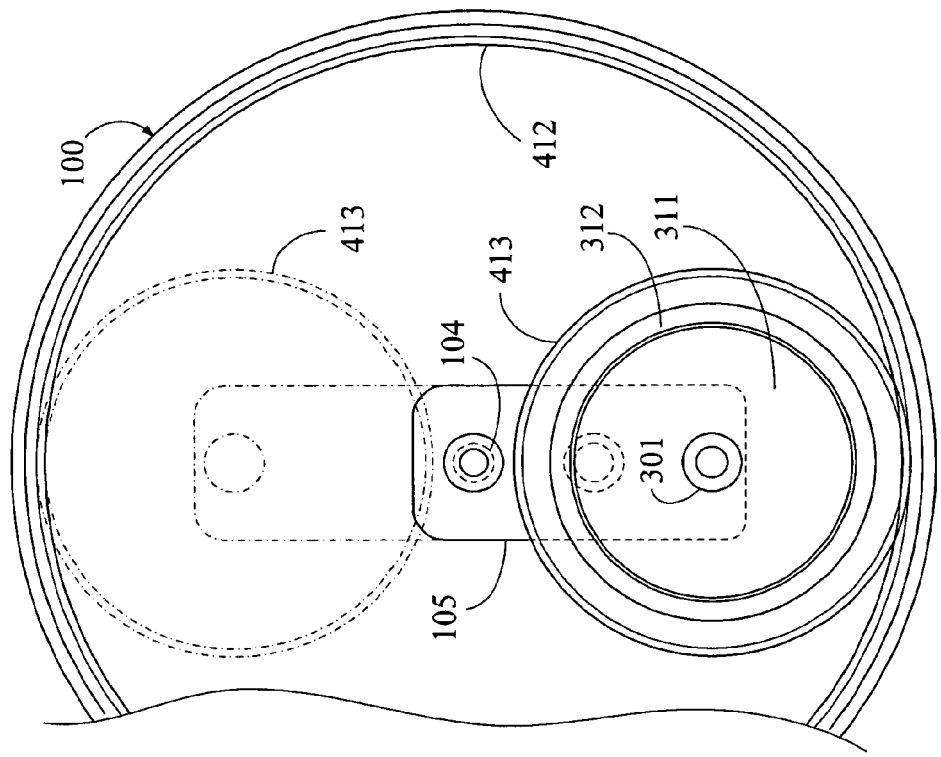
FIG. 18 is the operational front sectional view of the present invention in FIG. 17.

FIG. 18 is the operational front sectional view of the present invention in FIG. 17.

As shown in FIG. 17 and FIG. 18, the offset structure (200) has a one-piece fixed axle (104) penetrating through the axle holes (102) installed on both sides and at the center of the wheel disc, and a section of the axle that combines with the offset structure (200) when the fixed axle (104) passes through the wheel hub (101) interior. The extension arm (105) of the offset structure (200) is to permanently combine with both ends of the electrical machine arbor (301) of the fixed electrical machine static part (311) of the fixed outer rotating electrical machine (300). The driving axis of the outer rotating electrical machine rotary part (312) and the fixed axle (104) driving the wheel hub (101) become offset and uncoaxial with each other. Ring type outer running wheels (413) are coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned ring type inner running wheel (412) and the coaxially installed ring type outer running wheel (413) are composed of gears or friction wheels. The numbers of the driving steps of the aforementioned transmission is/are one or more steps.

The offset structure (200) that combined with the section of the fixed axle (104) which passes through the interior of the wheel hub (101) is formed by one or more axial or radial offset structures (200) extending outward for separate installation of one or more outer rotating electrical machines (300) and the relative running wheels (403) in order to jointly couple with the ring type inner running wheel inside the wheel hub so as to jointly drive the externally rotating mechanism; and to form a common externally rotating mechanism driven by multiple electrical machines.

FIG. 19 is the first operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

FIG. 20 is the operational front sectional view of the present invention in FIG. 19.

As shown in FIG. 19 and FIG. 20, the offset mechanism (200) is a U-shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). A running wheel (403) is installed on one side of the electrical machine rotary part (312) of the outer rotating electrical machine (300) that is performing outside rotation, and a ring type inner running wheel (402) which is using the fixed axle (104) as its axis is installed on the same side inside the wheel hub (101). The two running wheels couple and drive to form the transmission. A ring type outer running wheel (413) is coaxially installed on the exterior of the electrical machine rotary part (312) for coupling with the ring type inner running wheel (412) installed in the axial inner ring space of the externally rotating mechanism in order to form the transmission between the electrical machine rotary part (312) of the outer rotating electrical machine and the externally rotating mechanism (100). The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more.

Figure 21:
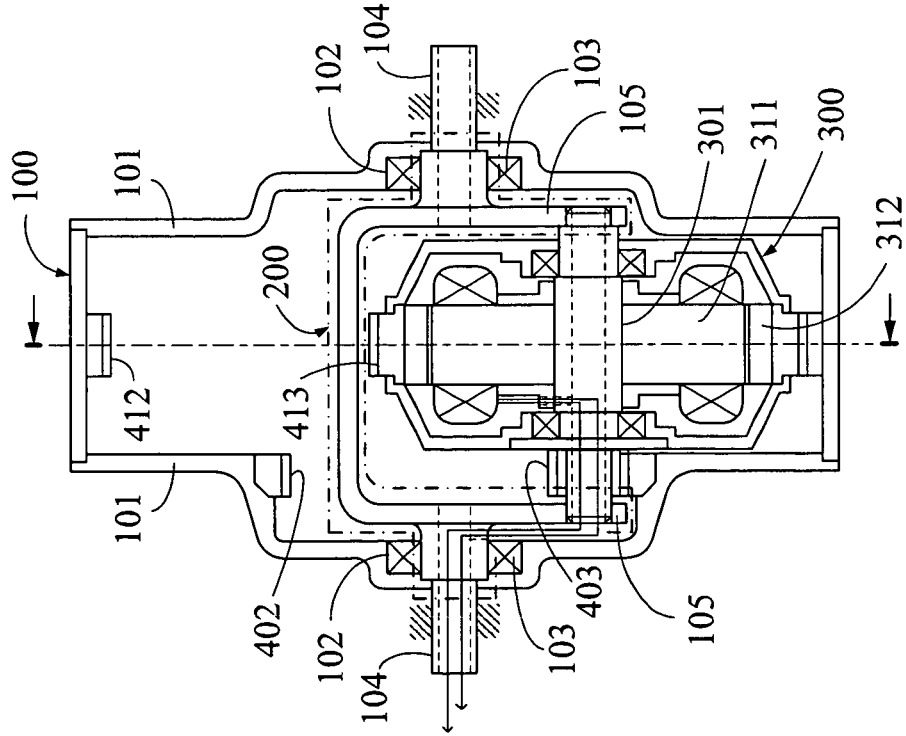
FIG. 21 is the second operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

FIG. 21 is the second operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

Figure 22:
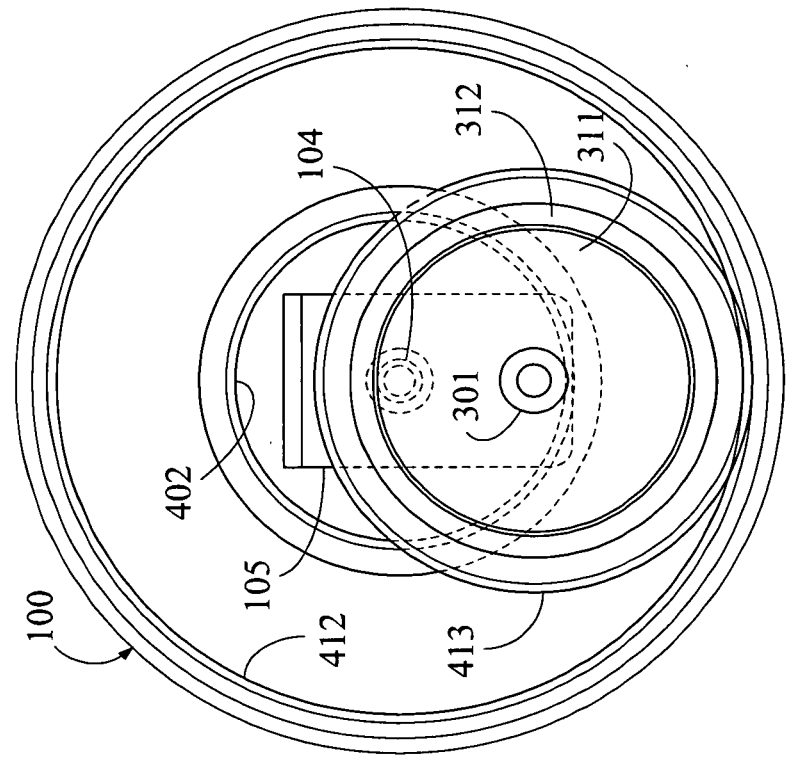
FIG. 22 is the operational front sectional view of the present invention in FIG. 21.

FIG. 22 is the operational front sectional view of the present invention in FIG. 21.

As shown in FIG. 21 and FIG. 22, the offset mechanism (200) is a square shape structure. The offset mechanism (200) is for combining with the fixed axle (104). Both ends of its extension arm (105) permanently combines with both ends of the electrical machine arbor (301) of the fixed electrical machine static part (311) of the outer rotating electrical machine (300), and a running wheel (403) is installed on one side of the electrical machine rotary part (312) of the outer rotating electrical machine (300) that is performing outside rotation, and a ring type inner running wheel (402) which is using the fixed axle (104) as its axis is installed on the same side inside the wheel hub (101). The two running wheels couple and drive to form the transmission. A ring type outer running wheel (413) is coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more steps.

FIG. 23 is the third operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on one side of the outer rotating electrical machine housing.

FIG. 24 is the operational front sectional view of the present invention in FIG. 23.

As shown in FIG. 23 and FIG. 24, the offset structure (200) has a one-piece fixed axle (104) penetrating through the axle holes (102) installed on both sides and at the center of the wheel disc, and a section of the axle that combines with the offset structure (200) when the fixed axle (104) passes through the wheel hub (101) interior. The extension arm (105) of the offset structure (200) is to permanently combine with both ends of the electrical machine arbor (301) of the electrical machine static part (311) of the outer rotating electrical machine (300) so that the driving axis of the outer rotating electrical machine rotary part (312) and the fixed axle (104) driving the wheel hub (101) become offset and uncoaxial to each other. A running wheel (403) is installed on one side of the electrical machine rotary part (312). A ring type inner running wheel (402) is installed around the fixed axle (104) axis on the same side inside the wheel hub (101). The two running wheels couple and drive to form the transmission; a ring type outer running wheel (413) is coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more steps.

The offset structure (200) that combined with the section of the fixed axle (104) which passes through the interior of the wheel hub (101) is formed by one or more axial or radial offset structures (200) extending outward for separate installation of one or more outer rotating electrical machine (300). Running wheel (403) is individually installed on one side of the electrical machine rotary part (312) of the individual outer rotating electrical machine to jointly couple with the ring type inner running wheels (402) on the same side of the wheel hub (101) interior. A ring type outer running wheel (413) is coaxially installed on the exterior of the electrical machine rotary part (312) for coupling with the ring type inner running wheel (412) installed in the axial inner ring space of the externally rotating mechanism (100) in order to form a common externally rotating mechanism driven by multiple electrical machines.

Figure 25:
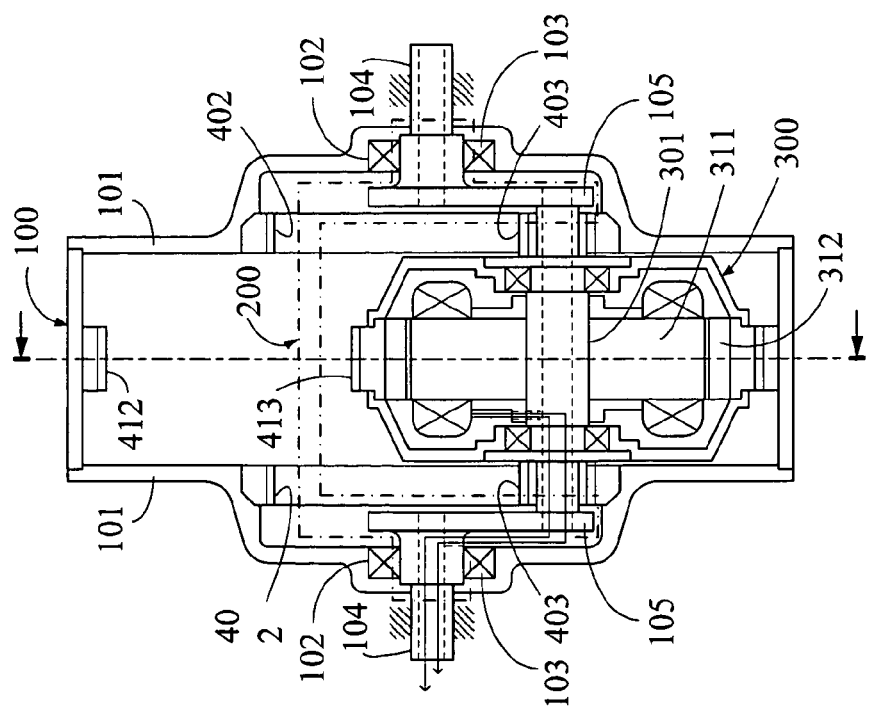
FIG. 25 is the first operational side sectional view of the present invention showing the surrounding of housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on both sides of the outer rotating electrical machine housing.

FIG. 25 is the first operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (101) and on both sides of the outer rotating electrical machine housing.

Figure 26:
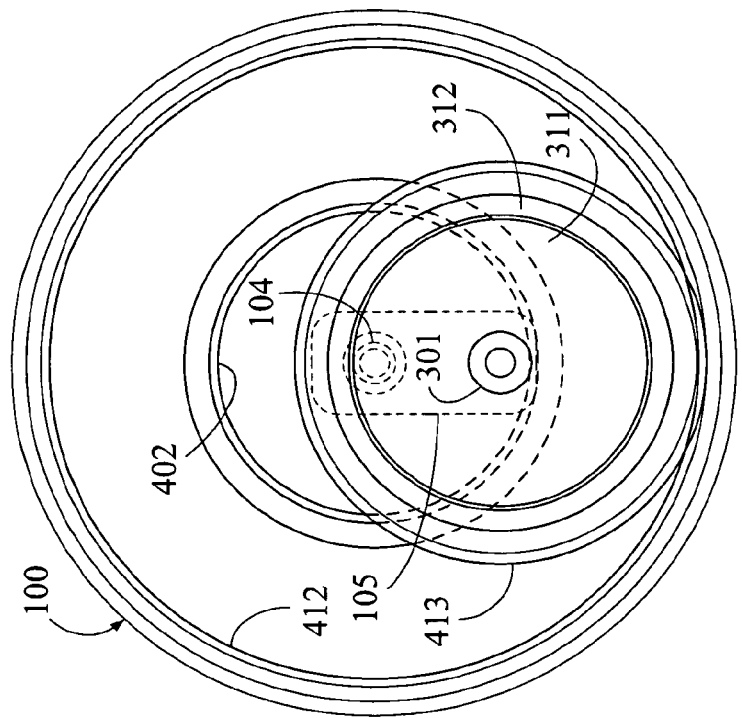
FIG. 26 is an operational front sectional view of the present invention in FIG. 25.

FIG. 26 is an operational front sectional view of the present invention in FIG. 25.

As shown in FIG. 25 and FIG. 26, the offset mechanism (200) is a U-shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). Running wheels (403) are installed on both sides of the electrical machine rotary part (312) of the outer rotating electrical machine (300) that is performing outside rotation, and ring type inner running wheels (402) which are using the fixed axle (104) as their axis are installed on the both sides of the wheel hub (101) interior. The two running wheels couple and drive to form the transmission. A ring type outer running wheel (413) is coaxially installed on the exterior of the electrical machine rotary part (312) for coupling with the ring type inner running wheel (412) installed in the axial inner ring space of the externally rotating mechanism in order to form the transmission between the electrical machine rotary part (312) of the outer rotating electrical machine and the externally rotating mechanism (100). The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more.

Figure 27:
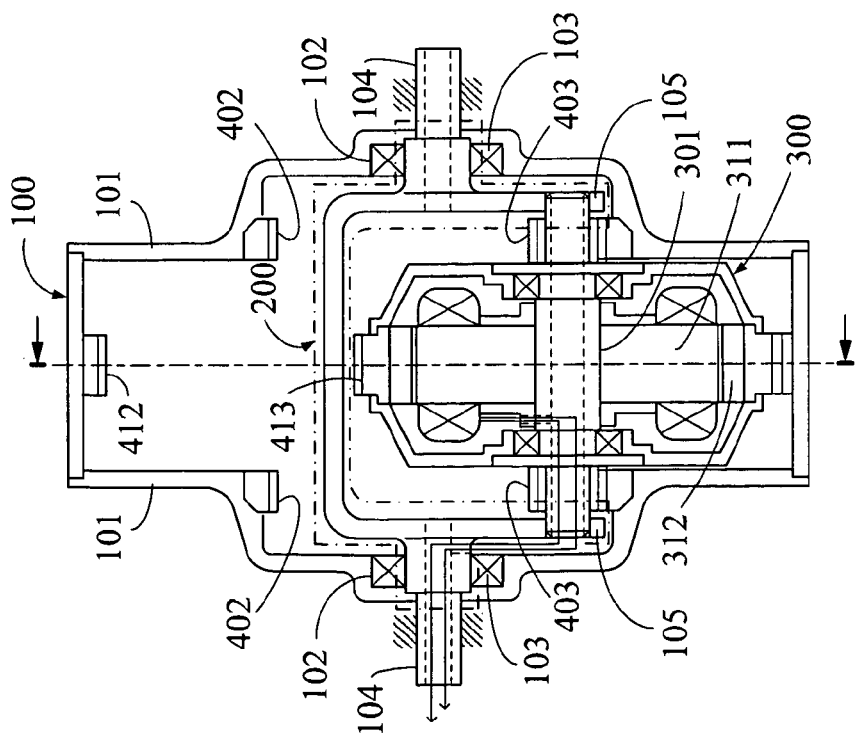
FIG. 27 is the second operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (10) and on both sides of the outer rotating electrical machine housing.

FIG. 27 is the second operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100);

and running wheels installed in the wheel hub (10) and on both sides of the outer rotating electrical machine housing.

Figure 28:
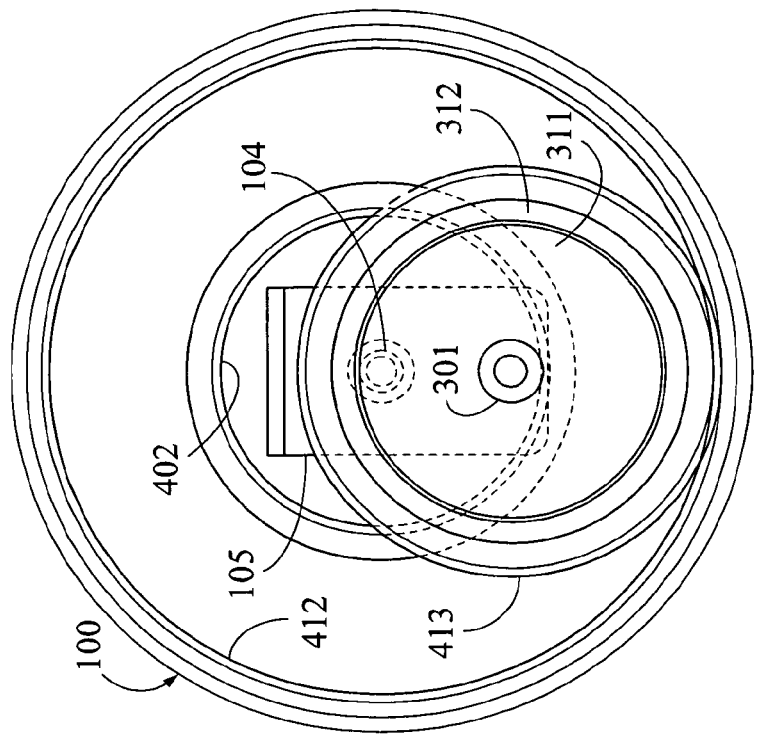
FIG. 28 is the operational front sectional view of the present invention in FIG. 27.

FIG. 28 is the operational front sectional view of the present invention in FIG. 27.

As shown in FIG. 27 and FIG. 28, the offset mechanism (200) is a square shape structure. The offset mechanism (200) is for combining with the fixed axle (104). Both ends of its extension arm (105) permanently combine with both ends of the electrical machine arbor (301) of the fixed electrical machine static part (311) of the outer rotating electrical machine (300). Running wheels (403) are installed on both sides of the electrical machine rotary part (312) of the outer rotating electrical machine (300) that is performing outside rotation, and ring type inner running wheels (402) which are using the fixed axle (104) as their axis are installed on both sides the wheel hub (101) interior. The two running wheels couple and drive to form the transmission. A ring type outer running wheel (413) is coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more steps.

Figure 29:
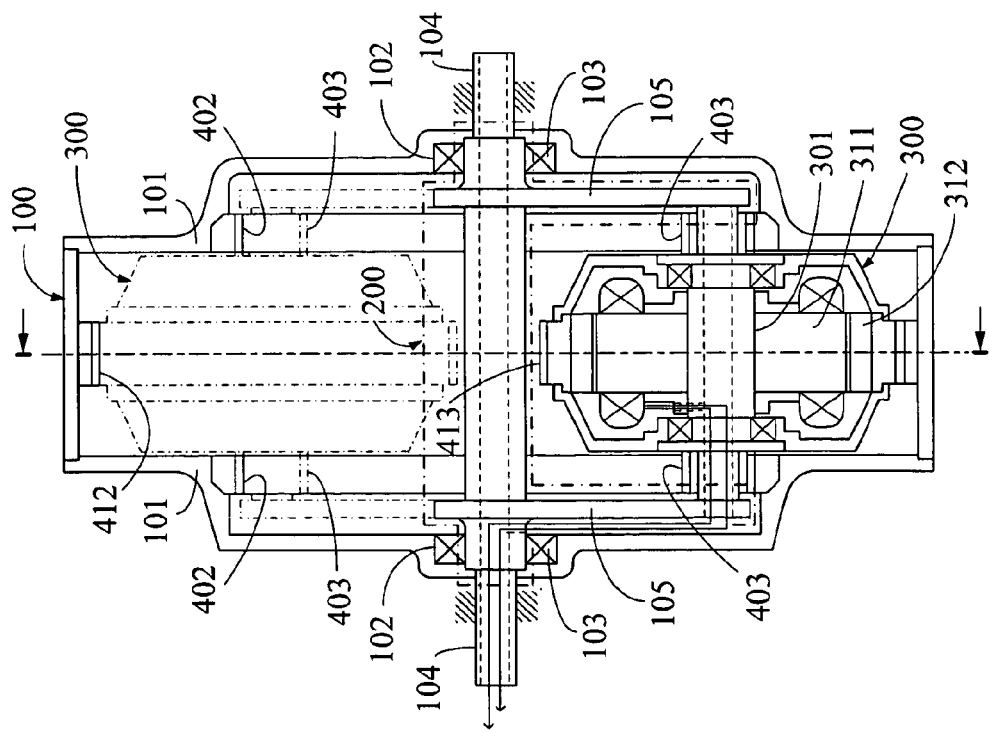
FIG. 29 is the third operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (10) and on both sides of the outer rotating electrical machine housing.

FIG. 29 is the third operational side sectional view of the present invention showing the surrounding of the housing of the outer rotating electrical machine rotary part of the outer rotating electrical machine (300) installed with ring type outer running wheel (413); and ring type inner running wheel (412) installed in the externally rotating mechanism (100); and running wheels installed in the wheel hub (10) and on both sides of the outer rotating electrical machine housing.

Figure 30:
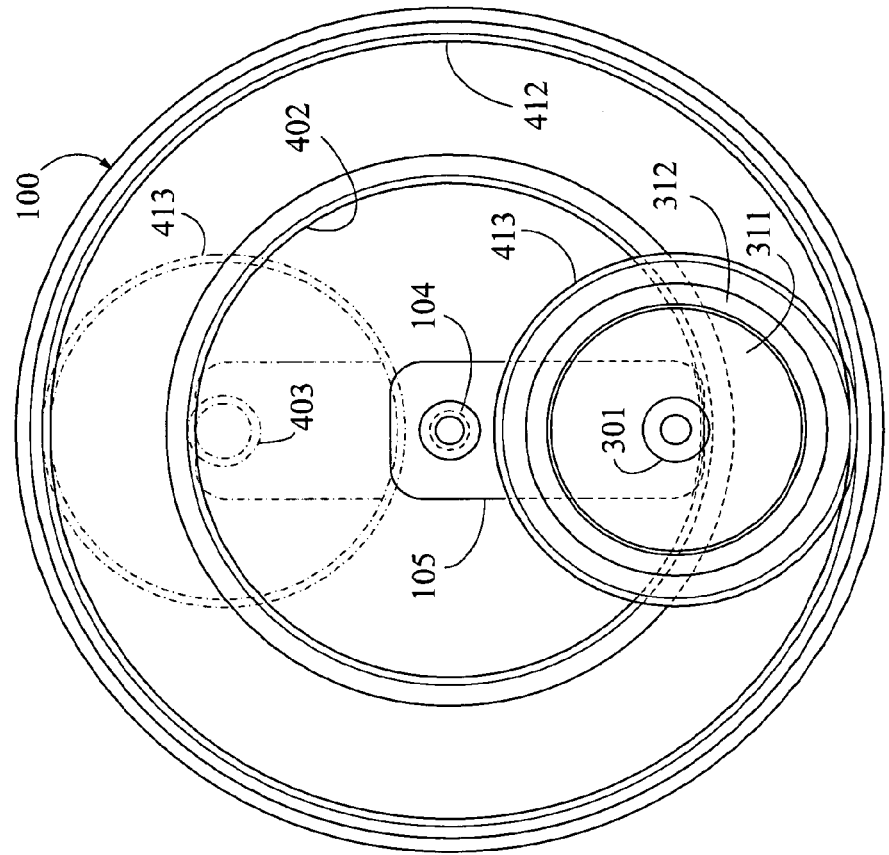
FIG. 30 is the operational front sectional view of the present invention in FIG. 29.

FIG. 30 is the operational front sectional view of the present invention in FIG. 29.

As shown in FIG. 29 and FIG. 30, the offset structure (200) has a one-piece fixed axle (104) penetrating through the axle holes (102) installed on both sides and at the center of the wheel disc, and a section of the axle that combines with the offset structure (200) when the fixed axle (104) passes through the wheel hub (101) interior. The extension arm (105) of the offset structure (200) is to permanently combine with both ends of the electrical machine arbor (301) of the electrical machine static part (311) of the outer rotating electrical machine (300) so that the driving axis of the outer rotating electrical machine rotary part (312) and the fixed axle (104) driving the wheel hub (101) become offset and uncoaxial to each other. Running wheels (403) are installed on both sides of the electrical machine rotary part (312). Ring type inner running wheels (402) are installed around the fixed axle (104) axis on both sides of the wheel hub (101) interior. The two running wheels couple and drive to form the transmission; a ring type outer running wheel (413) is coaxially installed on the exterior of the electrical machine rotary part (312) for coupling with the ring type inner running wheel (412) installed in the axial inner ring space of the externally rotating mechanism (100) in order to form the transmission between the electrical machine rotary part (312) of the outer rotating electrical machine and the externally rotating mechanism. The aforementioned running wheel (403) and ring type inner running wheel (402) as well as the ring type inner running wheel (412) and the coaxially installed ring type outer running wheel (413) are composed of gears and friction wheels. The numbers of driving steps of the aforementioned transmission is/are one or more steps.

The offset structure (200) that combined with the section of the fixed axle (104) which passes through the interior of the wheel hub (101) is formed by one or more axial or radial offset structures (200) extending outward for separate installation of one or more outer rotating electrical machine (300). Running wheels (403) are individually installed on both sides of the electrical machine rotary part (312) of the individual outer rotating electrical machine to jointly couple with the ring type inner running wheels (402) on the both sides of the wheel hub (101) interior. A ring type outer running wheel (413) is coaxially installed on the exterior of the electrical machine rotary part (312) for coupling with the ring type inner running wheel (412) installed in the axial inner ring space of the externally rotating mechanism (100) in order to form a common externally rotating mechanism driven by multiple electrical machines.

The choices for sealed type or open type outer rotating electrical machines (300) and wheel hubs (101) aforementioned in the various operational examples are dependent on ventilation and cooling requirements which includes:

Either the outer rotating electrical machine (300) or the wheel hub (101) is an open type structure, or
Both the outer rotating electrical machine (300) and the wheel hub (101) are sealed type structures, or
Both the outer rotating electrical machine (300) and the wheel hub (101) are open type structures.

The invention claimed is:
1. An externally rotating mechanism, comprising:
an external rotating mechanism (100) including a wheel hub (101) having a hollow cylindrical housing structure having central axle holes (102) at opposite ends of the housing structure and bearings (103) installed in the axle holes;
coaxial fixed axle structures (104) extending through the bearings (103) and axle holes (102) at opposite ends of the housing structure, said wheel hub (101) being rotatable around the fixed axle structures (104);
an electrical machine (300) having an electrical machine arbor (301), a stator (311) fixed to the electrical machine arbor (301), and an external rotor (312) rotatably mounted on the electrical machine arbor (301);
an offset structure (200) fixed to the axle structures (104), said offset structure (200) including extension arms (105) for mounting the electrical machine arbor (301) at a location within the hollow cylindrical housing structure and offset from the fixed axle structures (104);
a transmission including at least one of the following running wheel arrangements for transmitting rotational power between the external rotor (312) of the electrical machine and the external rotating mechanism (100):
(a) a first running wheel combination including a running wheel (403) fixed to one side of the external rotor (312) and rotatably coupled with a ring-shaped inner running wheel (402) fixed to and installed inside the wheel hub (101) coaxially with the fixed axle structures (104);
(b) a pair of running wheels (403) coaxially fixed to opposite sides of the external rotor (312) and rotatably coupled with a pair of ring-shaped inner running wheels (402) fixed to and installed inside opposite sides of the wheel hub (101) coaxially with the fixed axle structures (104);
(c) a ring-shaped outer running wheel (413) fixed to and extending around a rotating outer casing of the electrical machine (300) and rotatably coupled with a ring-shaped inner running wheel (412) installed on the external rotating mechanism (100);

(d) both running wheel arrangement (a) and running wheel arrangement (c) installed simultaneously; and (e) both running wheel arrangement (b) and running wheel arrangement (c) installed simultaneously.

2. An externally rotating mechanism as claimed in claim 1, wherein said electrical machine is one of a brushless or brushed, direct or alternating current motor or generator.

3. An externally rotating mechanism as claimed in claim 1, wherein said electrical machine (300) is externally connected by a lead wire (320) that runs along one of the extension arms (105) and through a wire hole in the fixed axle structure (104).

4. An externally rotating mechanism as claimed in claim 1, wherein the extension arms (105) of the offset mechanism (200) form a U-shape with the electrical machine arbor (301), and the transmission includes running wheel arrangement (a).

5. An externally rotating mechanism as claimed in claim 1, wherein the offset mechanism (200) forms a square shape with the electrical machine arbor (301), and the transmission includes running wheel arrangement (a).

6. An externally rotating mechanism as claimed in claim 1, wherein the fixed axle structures (104) include a one-piece fixed axle structure that extends through the axle holes (102) on both sides of wheel hub (101), and the transmission includes running wheel arrangement (a).

7. An externally rotating mechanism as claimed in claim 1, wherein the extension arms (105) of the offset mechanism (200) form a U-shape with the electrical machine arbor (301), and the transmission includes running wheel arrangement (b).

8. An externally rotating mechanism as claimed in claim 1, wherein the offset mechanism (200) forms a square shape with the electrical machine arbor (301), and the transmission includes running wheel arrangement (b).

9. An externally rotating mechanism as claimed in claim 1, wherein the fixed axle structures (104) include a one-piece fixed axle structure that extends through the axle holes (102) on both sides of wheel hub (101), and the transmission includes running wheel arrangement (b).

10. An externally rotating mechanism as claimed in claim 1, wherein the extension arms (105) of the offset mechanism (200) form a U-shape with the electrical machine arbor (301), and the transmission includes running wheel arrangement (c).

11. An externally rotating mechanism as claimed in claim 1, wherein the offset mechanism (200) forms a square shape with the electrical machine arbor (301), and the transmission includes running wheel arrangement (c).

12. An externally rotating mechanism as claimed in claim 1, wherein the fixed axle structures (104) include a one-piece fixed axle structure that extends through the axle holes (102) on both sides of wheel hub (101), and the transmission includes running wheel arrangement (c).

13. An externally rotating mechanism as claimed in claim 1, wherein the extension arms (105) of the offset mechanism (200) form a U-shape with the electrical machine arbor (301), and the transmission includes running wheel arrangement (d).

14. An externally rotating mechanism as claimed in claim 1, wherein the offset mechanism (200) forms a square shape with the electrical machine arbor (301), and the transmission includes running wheel arrangement (d).

15. An externally rotating mechanism as claimed in claim 1, wherein the fixed axle structures (104) include a one-piece fixed axle structure that extends through the axle holes (102) on both sides of wheel hub (101), and the transmission includes running wheel arrangement (d).

16. An externally rotating mechanism as claimed in claim 1, wherein the extension arms (105) of the offset mechanism (200) form a U-shape with the electrical machine arbor (301), and the transmission includes running wheel arrangement (e).

17. An externally rotating mechanism as claimed in claim 1, wherein the offset mechanism (200) forms a square shape with the electrical machine arbor (301), and the transmission includes running wheel arrangement (e).

18. An externally rotating mechanism as claimed in claim 1, wherein the fixed axle structures (104) include a one-piece fixed axle structure that extends through the axle holes (102) on both sides of wheel hub (101), and the transmission includes running wheel arrangement (e).

19. An externally rotating mechanism as claimed in claim 1, wherein the electrical machine (300) and wheel hub (101) are arranged according to ventilation requirements to have one of the following configurations: (i) a first one of the electrical machine (300) and the wheel hub (101) is an open structure and a second one of the electrical machine (300) and the wheel hub (101) is a sealed structure; (ii) both the electrical machine (300) and the wheel hub (101) are sealed structures; and (iii) both the electrical machine (300) and the wheel hub (101) are open structures.

* * * * *